Jan. 31, 1967  R. F. GAERTNER  3,301,314
METHOD AND MEANS FOR INCREASING THE HEAT
TRANSFER COEFFICIENT BETWEEN A WALL
AND BOILING LIQUID
Filed March 3, 1964  2 Sheets-Sheet 1

Inventor:
Richard F. Gaertner,
by Leo J. MaLossi
His Attorney.

Jan. 31, 1967  R. F. GAERTNER  3,301,314
METHOD AND MEANS FOR INCREASING THE HEAT
TRANSFER COEFFICIENT BETWEEN A WALL
AND BOILING LIQUID
Filed March 2, 1964  2 Sheets-Sheet 2

Inventor:
Richard F. Gaertner,
by Leo J. MaLossi
His Attorney.

United States Patent Office 3,301,314
Patented Jan. 31, 1967

3,301,314
METHOD AND MEANS FOR INCREASING THE HEAT TRANSFER COEFFICIENT BETWEEN A WALL AND BOILING LIQUID
Richard F. Gaertner, Rexford, N.Y., assignor to General Electric Company, a corporation of New York
Filed Mar. 2, 1964, Ser. No. 348,727
6 Claims. (Cl. 165—1)

This invention relates to the preparation of a heat transfer surface for enhancing the nucleate boiling of liquids adjacent thereto and more particularly to the provision of bubble nucleation sites having a high degree of stability and reliability.

Bubble nucleation sites are minute surface imperfections, cavities or scratches either naturally occurring or intentionally introduced, which are able to trap a small amount of gas, such as air, when the boiling vessel is filled and the advancing liquid front covers the surface. Only those surface imperfections which are not completely wetted can serve as active sites for the nucleation of bubbles. But, whether or not a particular site will be active also depends on the size and geometry of the imperfection, the physical properties of the surface and of the liquid, the system pressure, and the surface temperature.

After boiling begins, the gas initially present in the nucleation site at incipient bubble nucleation is gradually replaced by vapor of the liquid being boiled. This vapor continues to function as a nucleation agent in the same manner as the original entrapped gas, and as long as the boiling proceeds in a steady-state manner the apparent nucleation properties of the site remain unchanged. However, if the surface is allowed to cool below the saturation temperature of the liquid, the vapor in the nucleation site will condense, and ordinarily the site will fill with liquid. It can then no longer function as a nucleation site, if the surface is again heated. In this manner heat transfer equipment which is periodically heated and cooled gradually loses its ability to nucleate bubbles, making further nucleate boiling of the liquid impossible. When this happens, continued heating can only make the liquid "bump."

In many applications of surface ebullition a high probability for the active nucleation of bubbles at the surface is very important as also is the capacity to rely upon the nucleation sites being active at a low surface temperature and remaining active under any condition. Reliability upon the activity of nucleation sites is essential in such applications as control devices which are activated by bubble nucleation, ebulliently cooled electrical and electronic equipment, and some types of boiling water nuclear reactors. Until the present time, however, no method has been found for preparing a heat transfer surface that will provide bubble nucleation sites having a high degree of stability and reliability.

It is, therefore, an object of the present invention to provide a method for providing a heat transfer surface with bubble nucleation sites having a high degree of stability and increasing the rate of heat transfer through the surface.

Another object of this invention is to provide novel bubble nucleation site construction such that the nucleation sites remain active not only during prolonged steady-state boiling, but also during cyclic heating operations during which the surface having the nucleation sites is periodically heated and cooled.

It is a further object of this invention to provide treatment for a heat transfer surface whereby the superheat required for incipient boiling of liquids from this surface is substantially reduced.

It is still a further object to eliminate dimensional considerations in the creation of artificial nucleation cavities by the provision of suitable treatment for such cavities.

The above-noted objects may be secured for a heat transfer surface particularly in those instances wherein bubble nucleation sites have been deliberately introduced in accordance with the aforementioned guidelines for their location by covering the inside surface of the nucleation site cavity with a material with which the liquid to be boiled preferably has a contact angle greater than about 80°. A number of materials may be selected for covering the nucleation sites employing the following criteria; the material must be insoluble in the boiling liquid, must be chemically and thermally stable, must have a melting point which is sufficiently above the temperature of the heated surface that the material does not soften and leave the nucleation site cavities, must have good adhesion to the substrate material of which the heat transfer surface is composed both at the elevated temperatures and in the environment of the boiling liquid, and must be a low surface energy material highly non-wetted by the liquid, that is, the material must yield contact wetting angles of about 80° or greater with the liquid being heated.

The exact nature of this invention as well as other objects and advantages thereof will be readily apparent from consideration of the following specification relating to the annexed drawings in which.

Figure 3A:
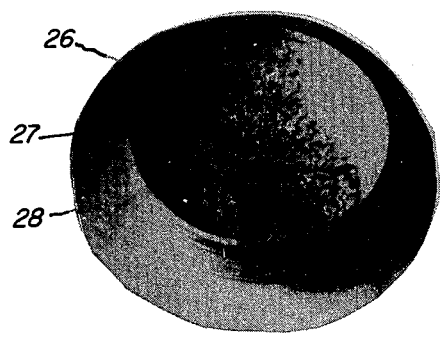
Figure 4A:
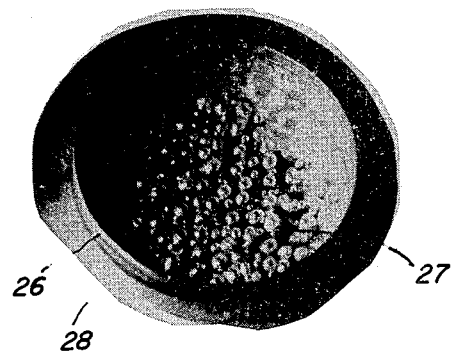
Figure 3B:
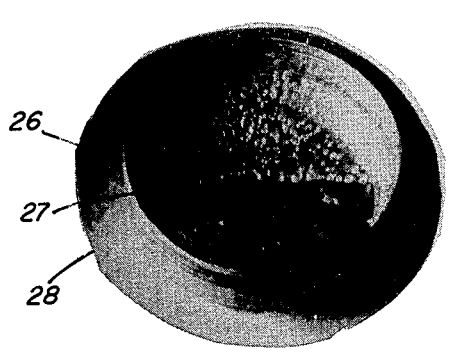
Figure 4B:
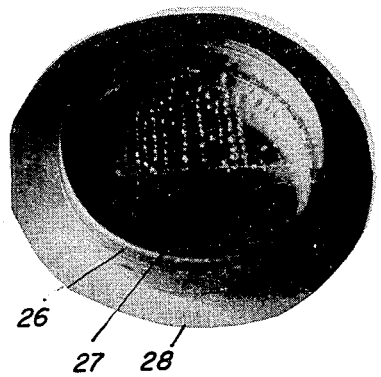

FIGS. 3a and 3b are photographic reproductions providing a visual comparison of the effectiveness of the use of a low surface energy material at spaced locations over a heat transfer surface in accordance with this invention under the application of temperature cycling; and FIGS. 4a and 4b are similar to FIGS. 3a and 3b, but employ a different configuration for the artificial nucleation site.

Figure 1:
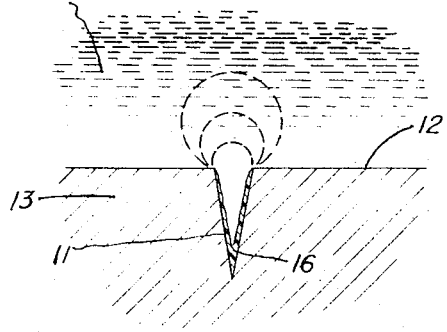
FIG. 1 is a cross sectional view through an artificial bubble nucleation site showing a preferred embodiment of the novel treatment of this invention.

Fabrication of the configuration of artificial bubble nucleation site containing a quantity of low surface energy material shown in FIG. 1 was effected by introducing at uniformly spaced intervals small conically-shaped cavities 11 into the face 12 of the heat transfer wall 13 in contact with the mass of liquid 14 as by the use of a needle-sharp punch. Artificial sites of other shapes, such as cylindrical holes, for example, have been successfully employed. Next the overall face 12 was coated with a thin layer of low surface energy material 16, such as polytetrafluoroethylene, which enters and coats the walls of the small cavities 11. Then the thin film of low surface energy material 16 is removed from the flat face 12 as by abrasion thereby leaving the thin film of material 16 deposited within each cavity 11 as shown whereby some desired pattern of discrete loci of material 16 is secured.

Deposition of the thin film of low surface energy material 16 may be effected by spraying this material over face 12 in the form of a finely divided aerosol or by casting the film in place thereover from an emulsion or solution thereof. By the use of a template (not shown) which masks off all of the area of the face 12 other than the openings to the artificial nucleation sites 12, deposition of the low surface energy material 16 directly into the nucleation sites may be accomplished.

Figure 2:
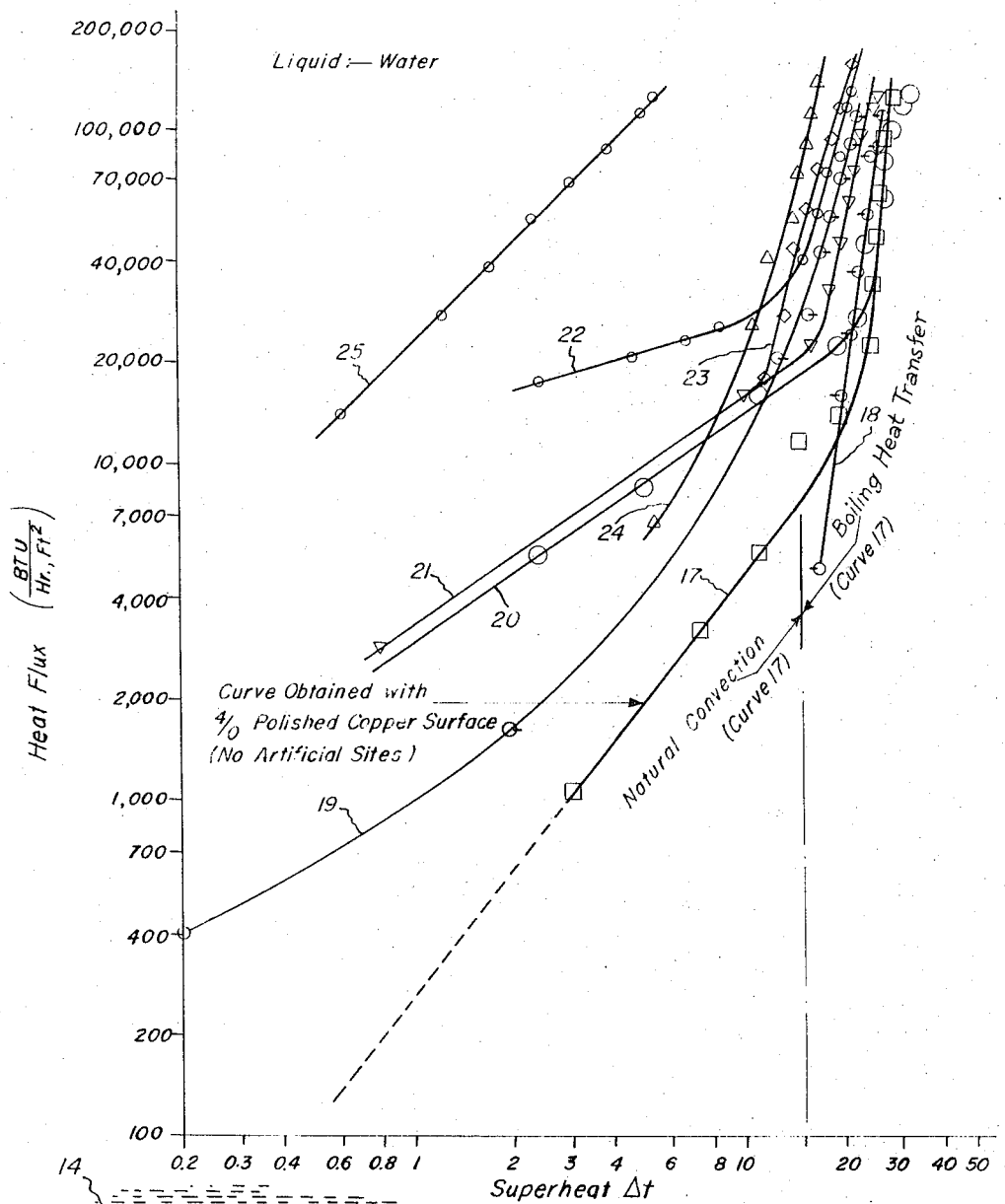
FIG. 2 is a graph showing the increased rates of boiling heat transfer obtained with surfaces provided with artificial bubble nucleation sites prepared in accordance with this invention.

The effect of the presence of artificial nucleation sites so fabricated and prepared on the heat transfer properties of a surface for the boiling of liquids is pronounced. The graphs displayed in FIG. 2 indicate the effect of artificial nucleation sites prepared as shown in FIG. 1, i.e., coated with polytetrafluoroethylene, on the heat transfer properties of a copper surface for boiling water. Curve 17 also shows that natural nucleation sites on an unmodified (without artificial sites) polished copper surface do not become active until the superheat (surface temperature minus bulk liquid temperature) has reached a value of at least about 15° F. and even at that temperature and degree of superheat only a few sites were active. At superheats below 15° F. no bubbles were formed and heat was transferred by natural convection, which is an inefficient form of heat transfer as compared to heat transfer by the mechanism of boiling.

Curve 18 shows the effect of introducing artificial nucleation sites into a copper surface and boiling water therewith without first treating these sites with low surface energy material. The steep slope of curve 18 shows a sharp increase in the rate of heat transfer over the polished copper surface having no artificial nucleation sites (curve 17). However, in contrast thereto, curve 19 shows the dramatic change wrought in the performance of the identical copper surface (69 conically-shaped indentations in a one-inch diameter surface) as produced the data for curve 18 by treating the indentations in accordance with this invention. A very much lower superheat was required to activate the sites to nucleate bubbles after treatment thereof and the rate of heat transfer was substantially improved.

In the case of copper surfaces prepared with artificial nucleation sites (curves 20, 21, 22, 23, 24 and 25) many of the artificial nucleation sites and in some instances all of them became active at very low superheats, i.e., values of only 1 or 2° F. or less. The curves differ in that they represent the results obtained with surfaces having different arrangements and configurations of the artificial sites. Thus:

| Curves: | Description of artificial sites |
|---|---|
| 18 | 69 holes (untreated) spaced uniformly over a one-inch diameter surface. |
| 19 | 69 holes (treated) spaced uniformly over a one-inch diameter surface. |
| 20 | 19 pits, ¼" apart on triangular spacing. |
| 21 | 55 pits, 0.144" apart on triangular spacing. |
| 22 | 2 scratches, ½" apart. |
| 23 | 3 scratches, ¼" apart. |
| 24 | 7 scratches, ⅛" apart. |
| 25 | 15 scratches, 1/16" apart. |

It is manifest, therefore, that a much earlier initiation of the boiling or evaporative phenomenon may be realized by introducing artificial nucleation sites to the heat transfer surface prepared as described herein.

Although it is preferred that the artificial nucleation sites be uniformly distributed over the heat transfer surface, spacing of these sites is not critical. However, the more nucleation sites impressed in the surface, the more pronounced the increase in heat transfer through the heat transfer wall.

In many applications of surface ebullition, it is very important that the heat exchange surface have both a high probability for the nucleation of bubbles and a high degree of reliability that the nucleation sites will not only be active at a low surface temperature but that these sites will remain active under any change of conditions. Unfortunately, prior to the development of the instant invention even the pronounced advantage produced by the use of artificial nucleation sites without the use of a low surface energy material was transient and was soon lost due to deactivation of these sites. Some deactivation occurred during prolonged steady-state boiling, but deactivation was more pronounced during cyclic heating operations during which the heat exchange surface is periodically heated and cooled.

It has been discovered that by depositing a low surface energy material, such as polytetrafluoroethylene, in discrete spaced locations over the heat transfer surface area within the artificial nucleation sites, not only do these sites remain active during prolonged steady-state boiling, but the sites also remain unquenched for a remarkably long period of time, when the system is subjected to temperature cycling. In addition to having this advantage, the instant construction avoids the disadvantageous changes that normally occur over the heat exchange surface area by the deposition thereon during boiling of a layer of precipitated mineral matter. Observations of the treated nucleation sites in the boiling of sea water has established that precipitated mineral matter may accumulate around but not in these sites.

As stated above, the preferred location for the deposits of low surface energy material is in a protected position within pits, impressions and indentations of various forms disposed in spaced relationship over the face of the heat transfer wall. However, the reason for the use of this protected location is that by and large the low surface energy materials to be used in connection with the boiling or evaporation of common liquids, such as water, brine and organic compounds, have little resistance to abrasion. Also these materials would offer resistance to heat transfer, if deposited as spots of comparable area (the surface area of the deposit is substantially larger than the area of the opening in face 12) on the face of the heat transfer wall, and could conceivably be contaminated by the coating thereof with mineral matter precipitating from the heated liquid.

On the other hand, as is conceivable in the case of liquid metals such as mercury or molten sodium or potassium, a substance, such as diamond, having low surface energy relative thereto may not have the aforementioned limitations. Thus, in applications in which liquid metals are being handled at low rates of flow the low surface energy material may be located at spaced intervals in the form of buttons or studs protruding into the liquid from the surface of the heat transfer wall.

The unique stability afforded to artificial bubble nucleation sites by the use of the treatment disclosed herein has been illustrated by impressing many small (about ½ mm. across at the surface of the metal) conically-shaped cavities into the inside bottom surface of a 3-inch diameter tin-plated steel can 26 (FIGS. 3a, 3b) with a sharp punch the cavities being substantially uniformly distributed over the bottom. One-half of the punched surface 27 was covered with masking tape and the other half was sprayed with a suspension of polytetrafluoroethylene particles in an organic binder.

It had previously been determined that the contact angle of water with the surface of a deposit of the polytetrafluoroethylene material is about 108° as compared to a contact angle of about 60° with the uncoated metal surface. The aforementioned contact angle of 60° with an uncoated metal surface has been found to be relatively constant and independent of the particular metal. Unless the metal surface is specially cleaned of contaminants and oxides in which case the contact angle may be reduced to zero, the usual contact angle of water with a metal surface will be in the range of from about 40° to a maximum of 70°.

As earlier described, on the coated half of surface 27 the polytetrafluoroethylene film was mechanically removed from the flat inside face of bottom 27 thereby retaining the coating of polytetrafluoroethylene only on the inside surfaces of the small cavities as shown in FIG. 1 in one half of surface 27. Thereafter, the masking tape was removed exposing the one-half of surface 27 having uncoated cavities.

The can 26 was then filled with water, which previously had been distilled two times. The can so filled with water was placed on a hot plate 28. During the initial heating and boiling (FIG. 3a) substantially all of the tiny cavities served as active bubble-producing sites as shown. However, after the can had been cooled and then reheated a few times, most of the cavities lacking the deposit of low surface energy material stopped producing bubbles. These cavities became filled with water when the can was cooled wetting the metal surface of the inside of the cavities. After these sites had been wetted, they were no longer able to function as active sites upon reheating. However, as may be seen in FIG. 3b all of the cavities on the treated half of the bottom continued to function as active nucleation sites. These cavities could not be quenched no matter how many times the can was heated and cooled.

These experiments have been repeated with copper surfaces and the results have substantiated those reported for a tin-plated steel can.

A similar experiment was performed to determine whether the configuration of the artificial nucleation site had any effect on this phenomenon. Thus, as is shown in FIGS. 4a and 4b, a similar can was prepared wherein instead of introducing tiny spaced conically-shaped cavities into and uniformly distributed over the inside bottom surface, narrow parallel scratches having about the same cross-section as shown for cavity 11 in FIG. 1 and uniformly spaced were impressed into the inside surface of the bottom of the can. As was noted above, one-half of the bottom surface was treated with polytetrafluoroethylene to produce an overall bottom surface wherein one-half of the artificial nucleation sites contained a deposit of a low surface energy material while the other half of the artificial nucleation configurations were free of polytetrafluoroethylene, the low surface energy material.

During the initial heating and boiling, bubbles formed on the scratches over the entire surface of the bottom of the can (FIG. 4a). However, after the can had been cooled and reheated a few times, only the extent of the scratches on the treated half of the surface remained active (FIG. 4b). Although this can, as well, was cooled and reheated many times the active site scratches containing the firmly implanted deposits of polytetrafluoroethylene remained unwetted and could not be quenched.

The importance of applying the low surface energy material only at spaced locations, although this spacing is not critical, is shown by the fact that when the surface of the heat transfer wall in contact with the liquid to be boiled was coated with a film of polytetrafluoroethylene so as to cover the entire surface between the artificial bubble sites as well as being deposited within the bubble sites and this coating was retained thereover, the bubbles which formed at the active sites spread out over the surface and coalesced with bubbles formed at other active sites so that soon the entire surface became covered with a layer of vapor. This development of a layer of vapor is an undesirable boiling phenomenon, because it greatly reduces the rate of heat transfer to the liquid. In one experiment employing a film of polytetrafluoroethylene over the whole of the heat transfer surface the rate of heat transfer was reduced by a factor of two.

The theoretical explanation for the advantage gained by the presence of a low surface energy material when a bubble is formed in the system providing a liquid-vapor interface as described (FIG. 1) seems to lie in the fact that in the case of such material the work of adhesion of the liquid to the low surface energy material is less than the work of liquid cohesion and the cavity or nucleation site is difficult for the liquid to wet thereby promoting the presence of vapor and contributing to the stability of the cavity as an active nucleation site.

An additional effect of the presence of the low surface energy material is the theoretical possibility that if the contact angle of the liquid in the nucleation site cavities 11 is equal to or greater than 90° the cavities can produce bubbles when the surface temperature is equal to or even less than the boiling point of the liquid.

This latter conclusion has been substantiated by the following test. A metal can was prepared with its inside bottom surface indented with many small conical cavity artificial bubble sites in which were firmly adhered deposits of polytetrafluoroethylene. Double-distilled water was placed in the can and as part of the preparation the water was boiled and cooled through several cycles in order to thoroughly de-gas both the liquid and the heat transfer surface. The can was then disposed in the vapor space above the surface of boiling water in a beaker thereby insuring that the surface of the can could be no hotter than the saturation temperature of the water in the can. Bubbles formed at each nucleation site cavity and, although the rate of bubble growth was quite slow, the nucleation sites could not be extinguished even by cyclical cooling and reheating of the surface. Thus, in effect, these nucleation sites became activated and produced bubbles at zero superheat. This discovery is in direct opposition to prevailing opinion, which has held that some degree of superheat is always necessary to activate, that is to generate bubbles, in a nucleation site. The lowest known value of incipient boiling superheat, which has been reported in the literature is 3° F. and this value was obtained only by the use of a specially constructed reservoir-shaped active site. In the usual case a superheat of from 15 to 30° F. has been found to be necessary before a liquid would boil.

Although the principles set forth herein have been described in connection with the boiling of water, the most common heat transfer fluid, these conclusions should be equally valid with respect to the boiling of any other liquid, including organic liquids and liquid metals, provided that the heat exchange surface be provided with spaced deposits of a material with which the particular liquid being considered has a contact angle of about 80° or greater, the material used being well-adhered or affixed to the heat exchange surface. The material chosen should be inert to the system components, i.e., the liquid being boiled, and the material should not degrade at or near the boiling point of the liquid being boiled.

Some low surface energy materials are ideally suited to this usage and lack only the quality of good adhesion to the heat transfer surface such as within the artificial bubble nucleation sites. However, it has been shown that this deficiency can be remedied by joining such materials to the walls of the nucleation cavity with a stable binder material. Thus, depending upon the low surface energy material selected the deposited particles thereof may bond themselves directly to the heat transfer surface; a binder may be required, or preparatory surface treatment may be necessary. As an example of the first and last mentioned mechanisms, when polytetrafluoroethylene particles are transported to the surface as an aerosol no binder is required and when polytetrafluoroethylene particles are to be deposited from a water emulsion the following surface treatment may be used: remove surface oxides and contaminants; apply a primer solution of $CrO_3$, $H_3PO_4$ and polytetrafluoroethylene polymer and cure at about 450° F.; apply polytetrafluoroethylene particles from a water emulsion, and heat treat for about 15 minutes at about 750° F. Such methods are, however, available to those skilled in the art.

Following is a list of a number of materials which have been tested as successful ebulliators in water:

TABLE 1

| Material: | Approx. contact angle with water |
|---|---|
| (1) Polystyrene | 89 |
| (2) Phenol-formaldehyde resin | 81 |
| (3) Organopolysiloxane adhesive [1] | 88 |
| (4) Polyethylene | 94 |
| (5) Isomerized hydrocarbon rubber [2] | 88 |
| (6) Polytetrafluoroethylene | 108 |
| (7) Polychlorotrifluoroethylene | 90 |

[1] As described in U.S. 2,643,964. Other organopolysiloxanes, as for instance those mentioned in U.S. 2,258,218–2,258,222 and U.S. 2,448,756 may also be employed.
[2] As described in U.S. 1,605,180 and 1,744,880.

In addition to the above materials, the following low surface energy materials may be used:

TABLE 2

| Material: | Contact angle with water $\theta$ |
|---|---|
| (1) 80:20 copolymer of polytetrafluoroethylene and polychlorotrifluoroethylene | 100 |
| (2) 60:40 copolymer of polytetrafluoroethylene and polychlorotrifluoroethylene | 94 |
| (3) Polyethylene terephthalate | 81 |
| (4) Bis-phenol A polycarbonate (Lexan resin manufactured by General Electric Company) | 80 |

Alhough the criterion for the selection of the above-noted materials has been on the basis of a contact angle made by these materials with water, which has a surface tension of 72.8 dynes/cm., a different liquid could have been employed as a standard. However, liquids which have a surface tension higher than that of water generally would have a contact angle with the aforementioned materials greater than the contact angle values shown above and liquids which have a surface tension lower than water would have contact angles with the aforementioned materials smaller than the values for contact angles set forth above. Most organic liquids have low surface tensions and would usually have contact angles less than 90° with the aforementioned materials. Glycerol, formamide and ethylene glycol are among the organic liquids which are exceptions in this regard.

Tests were carried out over a period of about 12 days in order to determine the stability-longevity of the bubble nucleation propensities of artificial sites containing a quantity of low surface energy material. In the conduct of these tests, a 1-inch diameter copper surface was prepared with 55 small conical cavities impressed therein spaced in a triangular pattern approximately 0.144 inch apart. The inside surface area of the cavities or pits was coated with polytetrafluoroethylene and double-distilled water was used as the test liquid. In order to provide for a cycle of heating and cooling, a timer switch was incorporated into the circuit supplying the electrical power to the heater. This timer was set so that it repeatedly turned the power on for 1 hour and then turned it off for 1 hour. In this manner, the liquid was boiled for about 1 hour, stopped boiling for about 1 hour, boiled for a second hour, stopped boiling for a second hour and so on. At the beginning of the test at the peak of the "on" period, the boiling heat flux was determined to be 24,900 B.t.u./hr. ft.[2] and the $\Delta t$ (superheat) was 14.1° F. The results of the tests are reproduced below displaying the remarkable resistance to quenching:

TABLE 3

| Duration of test (hours:) | Percent of original 55 sites still active |
|---|---|
| 0 | 100 |
| 56 | 100 |
| 120 | 31 |
| 168 | 20 |
| 192 | 16 |
| 295 | 11 |

Therefore, in accordance with the description set forth herein a novel treatment wherein discrete deposits of a low surface energy material are disposed in spaced relationship over a heat transfer surface has been disclosed, which treatment has particular import in making more economical the evaporation of very large quantities of liquid, and in producing nucleation sites having pronounced reliability and greatly increased longevity in spite of exposure to temperature cycling thereby enabling the development of superior control devices.

It should be understood, of course, that the foregoing detailed disclosure relates to only a preferred embodiment of the invention and that numerous modifications or alterations may be made therein in view of the more general discussion in the specification without departing from the spirit and scope of the invention as hereinafter defined by the appended claims.

What I claim as new and desired to secure by Letters Patent of the United States is:

1. In connection with a heat transfer wall having a source of heat located on one side thereof and having liquid to be boiled against the heat transfer surface on the other side thereof, the improvement comprising a plurality of indentations of macroscopic dimension having a greater depth than the maximum width thereof and located in macroscopically spaced relationship over said heat transfer surface, said indentations being only partially filled with a deposit of a low surface energy material, said material having a contact wetting angle with the liquid of at least about 80°.

2. The improved heat transfer surface substantially as recited in claim 1 wherein the macroscopic indentations in the heat transfer surface are substantially uniformly distributed and the low surface energy material is deposited in said indentations in the form of thin films.

3. A heat transfer surface substantially as recited in claim 2 wherein the macroscopic indentations are substantially in the form of longitudinally-extending cuts in the heating surface and the low surface energy material is polytetrafluoroethylene bonded to the side and bottom areas of the interior of said indentations.

4. In a metal heat transfer surface having artificial nucleation sites located at macroscopically spaced positions thereover, said nucleation sites being in the form of small but macroscopic indentations in said heat transfer surface, the improvement comprising a thin coating of low surface energy material located within said indentations over the inner surface thereof, said indentations having an internal surface area much greater than the area of the heat transfer surface occupied by the openings into said indentations thereby providing a very large area of low surface energy material located in discontinuities in said heat transfer surface, said low surface energy material having a contact wetting angle of at least about 80° with the liquid to be boiled by the heat energy transferred thereto from said heat transfer surface.

5. The improved heat transfer surface substantially as recited in claim 4 wherein the macroscopic indentations are substantially conical in shape and substantially uniformly distributed over said heat transfer surface and the low surface energy material is thin polytetrafluoroethylene film bonded to the sides and bottoms of said indentations.

6. A method for providing durable nucleation sites in a metal heat transfer surface to be subjected to temperature cycling in the heating of a liquid disposed thereagainst comprising the steps of:
  (a) forming small macroscopic cavities in said surface,
    (1) said cavities being arranged in spaced relationship and substantially uniformly distributed over said surface,
  (b) introducing deposits of low surface energy material to partially fill said cavities,
    (1) said material being in the form of thin film bonded to the side and bottom area of the interior of said cavities and having a contact wetting angle with the liquid of at least about 80°, and
  (c) maintaining the non-cavity portion of said surface free of said material.

References Cited by the Examiner

UNITED STATES PATENTS 3,207,209   9/1965   Hummel _____ 165—133

ROBERT A. O'LEARY, *Primary Examiner.*

CHARLES SUKALO, *Examiner.*